United States Patent
Rowley

(10) Patent No.: US 11,205,938 B2
(45) Date of Patent: Dec. 21, 2021

(54) MAGNETIC TORQUE CONVERTOR FOR UTILITY APPLICATIONS

(71) Applicant: Gerald William Rowley, Delray Beach, FL (US)

(72) Inventor: Gerald William Rowley, Delray Beach, FL (US)

(*) Notice: Subject to any disclaimer, the term of this patent is extended or adjusted under 35 U.S.C. 154(b) by 0 days.

(21) Appl. No.: 16/781,175

(22) Filed: Feb. 4, 2020

(65) Prior Publication Data

US 2020/0251961 A1 Aug. 6, 2020

Related U.S. Application Data

(60) Provisional application No. 62/918,514, filed on Feb. 4, 2019.

(51) Int. Cl.
*H02K 7/18* (2006.01)
*H02K 7/06* (2006.01)

(52) U.S. Cl.
CPC .............. *H02K 7/1853* (2013.01); *H02K 7/06* (2013.01); *H02K 7/1869* (2013.01)

(58) Field of Classification Search
CPC ....... H02K 7/1853; H02K 7/06; H02K 7/1869
USPC ............................................................ 74/337
See application file for complete search history.

(56) References Cited

U.S. PATENT DOCUMENTS

| | | | | |
|---|---|---|---|---|
| 3,832,913 A | * | 9/1974 | Helmer | F16H 61/0202 475/154 |
| 4,082,969 A | * | 4/1978 | Kelly | H02K 49/102 310/103 |
| 4,167,684 A | * | 9/1979 | Kelly | H02K 49/102 310/103 |

* cited by examiner

*Primary Examiner* — Ha Dinh Ho
(74) *Attorney, Agent, or Firm* — Bachman & LaPointe, P.C.

(57) ABSTRACT

A magnetic torque converter comprising a platform configured to rotate about an axis; at least one riser coupled to the platform; at least one riser permanent magnet coupled to the at least one riser; a lifting cap supporting at least one lifting rod; a lifting rod permanent magnet coupled to the at least one lifting rod opposite the lifting cap, the lifting rod permanent magnet is configured to levitate along the at least one riser proximate the at least one riser permanent magnet through magnetic field repulsion, wherein the at least one riser permanent magnet comprises a magnetic pole opposite the lifting rod permanent magnet; and a connecting rod coupled to the lifting cap opposite the at least one lifting rod.

20 Claims, 3 Drawing Sheets

MAGNETIC TORQUE CONVERTOR FOR UTILITY APPLICATIONS

CROSS-REFERENCE TO RELATED APPLICATION

This application claims priority to U.S. Patent Application Ser. No. 62/918,514 filed Feb. 4, 2019.

BACKGROUND

The present disclosure is directed to improving the efficiency of mechanical and electrical devices by incorporating a magnetic torque convertor. The magnetic torque convertor is a helper device that reduces loads on electrical devices using mechanical advantage.

Most electric motors AC and DC use electromagnets and permanent magnets in their operations. Electromagnets draw current to a coil of copper to create magnetic flux lines. Permanent magnets create magnetic flux lines through its body. They are continuously producing magnetic lines of flux and do not draw current. Most magnet arrays are parallel or perpendicular to each other. They use repulsion or attraction to move across each other. There is a stator and a rotor in both electric motors and generators. Electric motors use electricity to produce torque. Generators use a power source of some sort to provide rotation of the rotor to produce electricity.

Typical engine torque converters use spinning turbine blades to deliver pressure continuously when spinning. Torque is transferred from one cavity to another cavity using hydraulics. The faster one turbine spins the faster the second turbine spins. However, during this power transfer energy is used during the application.

What is needed is a device that can improve the efficiency of loaded (electrical load or mechanical load) rotating systems.

SUMMARY

In accordance with the present disclosure, there is provided a magnetic torque converter comprising a platform configured to rotate about an axis; at least one riser coupled to the platform; at least one riser permanent magnet coupled to the at least one riser; a lifting cap supporting at least one lifting rod; a lifting rod permanent magnet coupled to the at least one lifting rod opposite the lifting cap, the lifting rod permanent magnet is configured to levitate along the at least one riser proximate the at least one riser permanent magnet through magnetic field repulsion, wherein the at least one riser permanent magnet comprises a magnetic pole opposite the lifting rod permanent magnet; and a connecting rod coupled to the lifting cap opposite the at least one lifting rod.

A further embodiment of any of the foregoing embodiments may additionally and/or alternatively include the connecting rod is coupled to at least one of a driveline assembly, a crankshaft and a drive axle, wherein the at least one of the driveline assembly, the crankshaft and the drive axle are coupled to at least one of a flywheel and a mechanical device that requires power to operate.

A further embodiment of any of the foregoing embodiments may additionally and/or alternatively include the at least one riser comprises a curved shape aligned with a curved shape of the platform and configured to guide the at least one lifting rod as the platform rotates.

A further embodiment of any of the foregoing embodiments may additionally and/or alternatively include the magnetic torque converter further comprises an external power source coupled to the platform through a drive belt or chain, the external power source configured to rotate the platform about the axis via the belt or the chain.

A further embodiment of any of the foregoing embodiments may additionally and/or alternatively include the magnetic torque converter further comprises a support frame attached to at least one lifting rod assembly, each of the at least one lifting rod assembly configured to support each of the at least one lifting rod.

A further embodiment of any of the foregoing embodiments may additionally and/or alternatively include the at least one riser is adjustable with respect to the platform, wherein the at least one riser forms an inclined plane relative to the platform.

A further embodiment of any of the foregoing embodiments may additionally and/or alternatively include the inclined plane comprises a range of the angle between magnetic fields of the at least one riser permanent magnet and the lifting rod permanent magnet of between 28 degrees and 33 degrees.

In accordance with the present disclosure, there is provided a magnetic torque converter comprising a platform configured to rotate about an axis; at least one riser coupled to the platform, the at least one riser forming a wedge relative to the platform; at least one riser permanent magnet coupled to the at least one riser, the at least one riser permanent magnet forming a riser permanent magnet magnetic field; at least one lifting rod; a lifting rod permanent magnet coupled to the at least one lifting rod, the lifting rod permanent magnet forming a lifting rod permanent magnet magnetic field, the lifting rod permanent magnet is configured to levitate above the at least one riser proximate the at least one riser permanent magnet through magnetic field repulsion responsive to the at least one riser moving under the lifting rod, wherein the at least one riser permanent magnet comprises a magnetic pole opposite the lifting rod permanent magnet; a support frame attached to at least one lifting rod assembly, each of the at least one lifting rod assembly configured to support each of the at least one lifting rod; an external power source coupled to the platform, the external power source configured to rotate the platform about the axis; and a connecting rod coupled to the lifting cap opposite the at least one lifting rod.

A further embodiment of any of the foregoing embodiments may additionally and/or alternatively include the at least one riser is adjustable with respect to the platform, wherein the at least one riser forms an inclined plane relative to the platform.

A further embodiment of any of the foregoing embodiments may additionally and/or alternatively include the inclined plane comprises a range of the angle between magnetic fields of the at least one riser permanent magnet and the lifting rod permanent magnet of between 28 degrees and 33 degrees.

A further embodiment of any of the foregoing embodiments may additionally and/or alternatively include the riser permanent magnet magnetic field and the lifting rod permanent magnet magnetic field can be varied by replacement.

A further embodiment of any of the foregoing embodiments may additionally and/or alternatively include the magnetic torque converter further comprises a down slope ramp coupled to the platform proximate the riser, the down slope ramp configured to rotate the platform responsive to the at least one lifting rod dropping due to forces of gravity.

A further embodiment of any of the foregoing embodiments may additionally and/or alternatively include the magnetic torque converter further comprises an electromagnet coupled to the platform around the axis; a reed switch responsive to a crank wheel coupled to the connecting rod; and an external energy user coupled to the crank wheel.

In accordance with the present disclosure, there is provided a process for converting torque enhanced by magnetic levitation comprising rotating a platform about an axis with a power source coupled to the platform, the platform including at least one riser coupled to the platform, the at least one riser forming a wedge relative to the platform; at least one riser permanent magnet coupled to the at least one riser, the at least one riser permanent magnet forming a riser permanent magnet magnetic field; lifting at least one lifting rod having a lifting rod permanent magnet coupled to the at least one lifting rod, the lifting rod permanent magnet having a lifting rod permanent magnet magnetic field; levitating the lifting rod permanent magnet above the at least one riser proximate the at least one riser permanent magnet through magnetic field repulsion responsive to the at least one riser moving under the lifting rod, wherein the at least one riser permanent magnet comprises a magnetic pole opposite the lifting rod permanent magnet; dropping the at least one lifting rod by the force of gravity responsive to the lifting rod permanent magnet moving past the at least one riser permanent magnet; and translating a connecting rod coupled to the lifting rod responsive to the lifting rod levitating and dropping.

A further embodiment of any of the foregoing embodiments may additionally and/or alternatively include the process further comprises rotating a driveline assembly coupled to the connecting rod.

A further embodiment of any of the foregoing embodiments may additionally and/or alternatively include the process further comprises rotating a drive axle coupled to a mechanical device responsive to the rotating the driveline assembly.

A further embodiment of any of the foregoing embodiments may additionally and/or alternatively include the process further comprises rotating the platform responsive to the at least one lifting rod dropping due to forces of gravity; wherein the platform comprises a down slope ramp coupled to the platform proximate the riser, the down slope ramp configured to rotate the platform responsive to the at least one lifting rod dropping.

A further embodiment of any of the foregoing embodiments may additionally and/or alternatively include the process further comprises guiding the at least one lifting rod with the at least one riser as the platform rotates; the at least one riser comprises a curved shape aligned with a curved shape of the platform.

A further embodiment of any of the foregoing embodiments may additionally and/or alternatively include the process further comprises adjusting the at least one riser with respect to the platform, wherein the at least one riser forms an inclined plane relative to the platform.

A further embodiment of any of the foregoing embodiments may additionally and/or alternatively include the inclined plane comprises a range of the angle between magnetic fields of the at least one riser permanent magnet and the lifting rod permanent magnet of between 28 degrees and 33 degrees.

An aspect of the present disclosure is to produce more efficiency for simple mechanical machines and electrical motors and generators. In order to do this the magnetic torque converter reduces the load component on the output shaft of the external power source. This load reduction is caused by using 3 mechanical advantages, a wedge, magnetic levitation, and gravity acting on the main drive components of the magnetic torque converter.

The magnetic torque converter (M.T.C.) is a helper device that reduces loads on electrical devices using mechanical advantage. This device can be powered by the output shaft of an electric motor, a pump, an air compressor, and other sources of rotational power. The M.T.C. is designed to reduce the normal electrical load and other types of workloads required by an electrical device or mechanical device using 3 distinct and different mechanical advantages. These mechanical advantages include the use of a wedge, levitation and gravity. The wedge is used in the design of the inclined ramps mounted to a rotating base. The magnetic levitation is used to reduce the weight of a moving mass. The moving weight is a permanent magnet located in the lifting arm assembly. The third mechanical advantage, gravity, is the force of energy that pushes the same moving mass downwards to complete a half rotational circle. The M.T.C. acts as a Booster energy pump reducing the energy requirements of the original (input) energy power supply.

The utility applications that can be accommodated include a mechanical device that requires power to operate such as, water pumps, air pumps, compressors, generators, D.C. electrical drive motors, wind turbines, and internal combustion engines but not limited to these applications.

By incorporating a device that transfers the energy of a reducing mechanical lift requirement to a drive line component system will result in overall efficiency of the driveline system. In order to reduce the mechanical lift requirement there has to be a reduction in the weight of the moving parts. One of the ways to reduce the weight of moving parts is to use magnetic levitation. When an object is being levitated the mass of the object remains the same but the space in which the mass is moving uses a force to direct the mass upward against the force of gravity.

This force can be created by bringing two permanent magnetics of opposite fields together in correct alignment that results in a continuous repulsion and separation space. This magnet power wave continues as long as the magnetic alignment remains the same and there is an external force that moves the magnets. The magnets are forced to perform work in this alignment displacing weights and moving them upwards creating levitation. This transfer of energy results in a reduced load requirement of the external power source that is passed along in the drive components of the magnetic torque converter.

Placement of the magnetic torque converter in line with existing power systems will result in more efficient power systems. End user utility applications include wind generators, pumping equipment, internal combustion engines, and D.C. motors and generators. The list of utility applications is not limited to the above list.

The disclosed device reduces load requirements of the external power source by 30-37% over standard power source setups. Another aspect is the use of magnetic levitation using special alignment of magnets. Another aspect of the invention is using of a continuous moving wedge or incline plane. Another aspect of the invention is the use of gravity to complete one half of a work cycle that rotates a shaft. Another aspect of the invention is the linear stacking of multiple magnetic torque converters to create varying size motors. Another aspect of the invention is the use of a proprietary magnetic angle alignment.

Another aspect of the present invention is the use of proprietary magnetic field flux manipulators using special designed copper coils when multiple magnets are used back to back. This magnetic field manipulation allows magnets to cross over one another without the normal field flux cogging.

This methodology uses a steady rotation by an external power source to produce a constant meshing of two opposing magnetic fields mounted on a horizontal rotor and on a vertical rotor. These continuous opposing fields cause a levitating effect. The masses that are uplifted during the levitation are slammed back to their original position using the force of gravity or steel springs. The orientation of the M.T.C. to the horizontal plane will dictate if the force of gravity or steel springs can be utilized. It is advantageous to use the force of gravity over springs because the efficiency will be greater and the gravitational force is free.

Other details of the magnetic torque converter are set forth in the following detailed description and the accompanying drawings wherein like reference numerals depict like elements.

DETAILED DESCRIPTION

Figure 1:
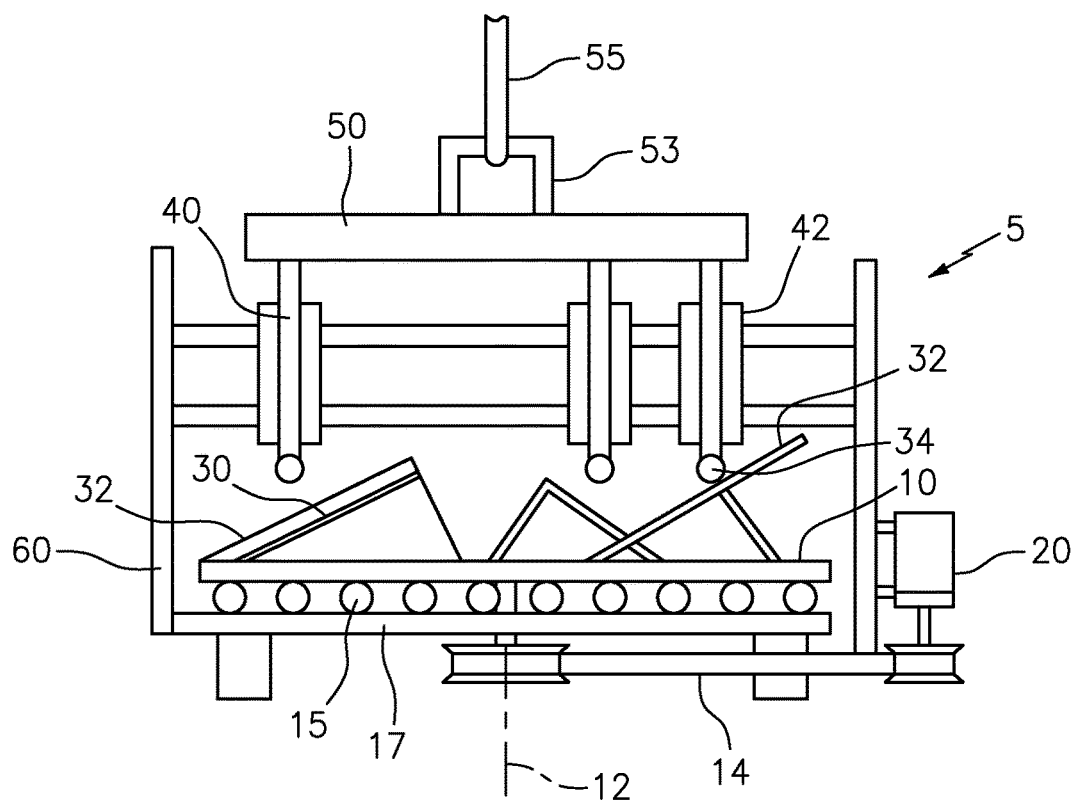
FIG. 1 is a schematic drawing of the side view of an exemplary embodiment of the magnetic torque converter.

FIG. 1 shows the main components that make up the M.T.C. (5) including the rotating base platform (10), the external power source (20), the risers (30), the permanent magnets (32) (34), the lifting rod assemblies (42), the lifting rods (40), the lifting cap (50), the race (17) and the support frame (60).

Figure 2:
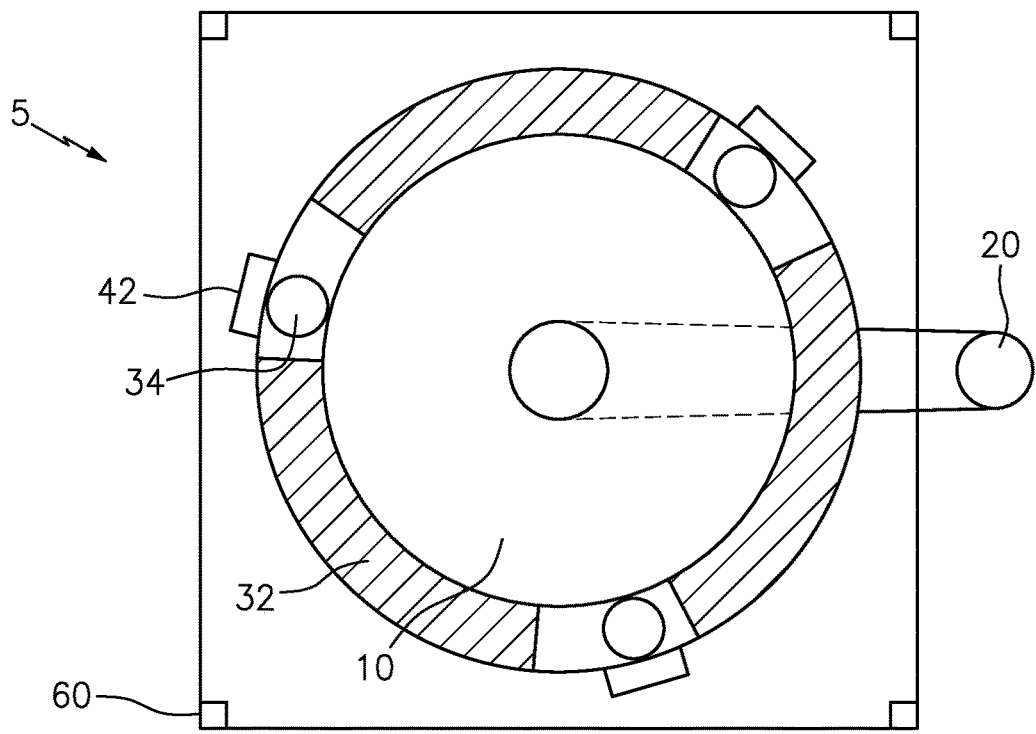
FIG. 2 is a schematic drawing of the top view of an exemplary embodiment of the magnetic torque converter.

FIG. 2 shows the support frame (60), the curved tops of the risers (30) covered with riser permanent magnets (32), the top side of the external power source (20), the lifting rod supports (42), the lifting rods (40) with the magnets (34) attached below, and the rotating base platform (10).

Figure 3:
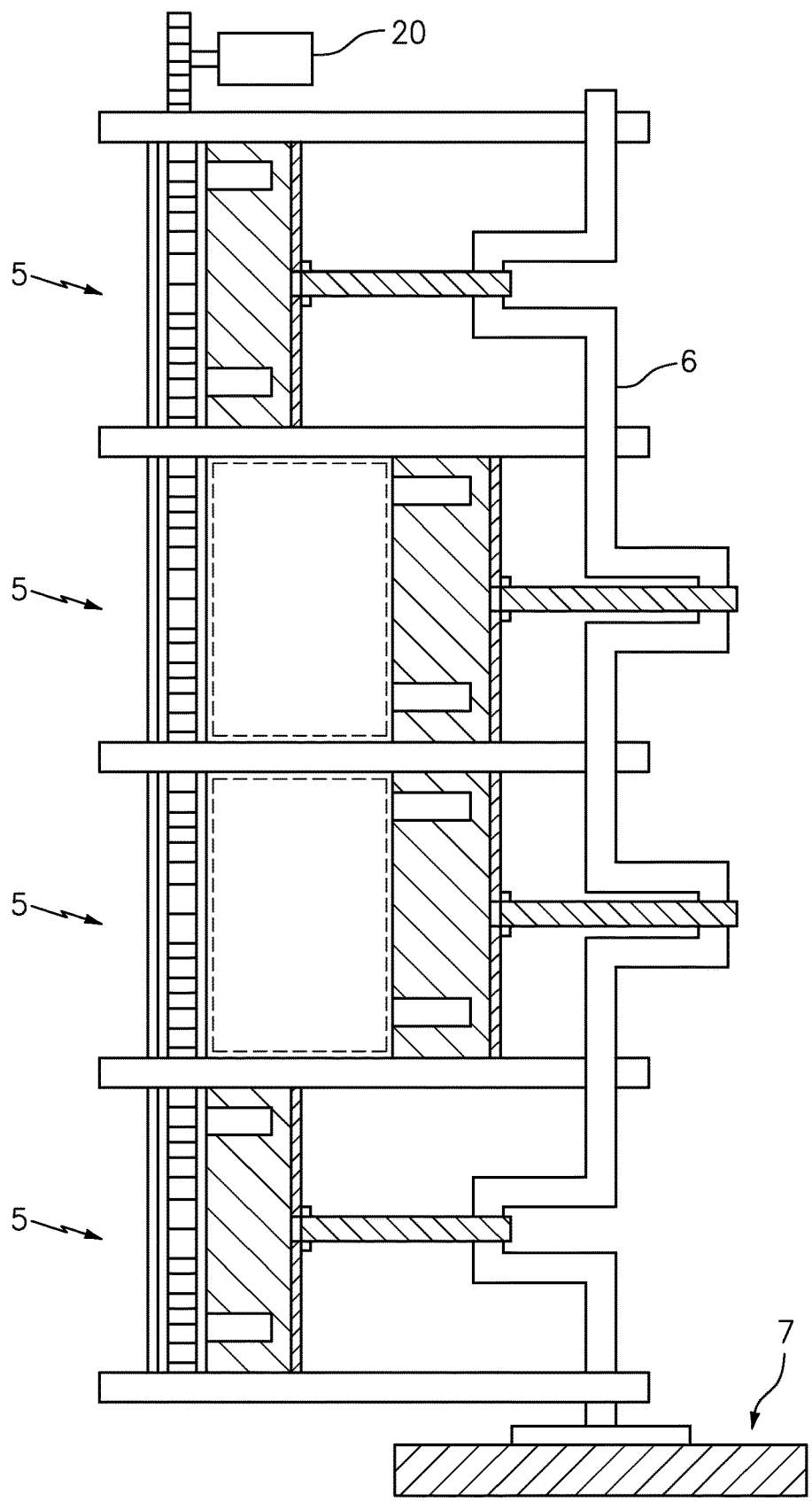
FIG. 3 is a schematic drawing of a linear setup using 4 individual M.T.C. modules connected together with a crankshaft.

FIG. 3 is a schematic drawing of a linear setup using 4 individual M.T.C. modules (5) connected together with a crankshaft (6). The schematic drawing also shows a flywheel (7) at the end of the crankshaft (6), and the external power supply (20). These embodiments are not limiting.

Figure 4:
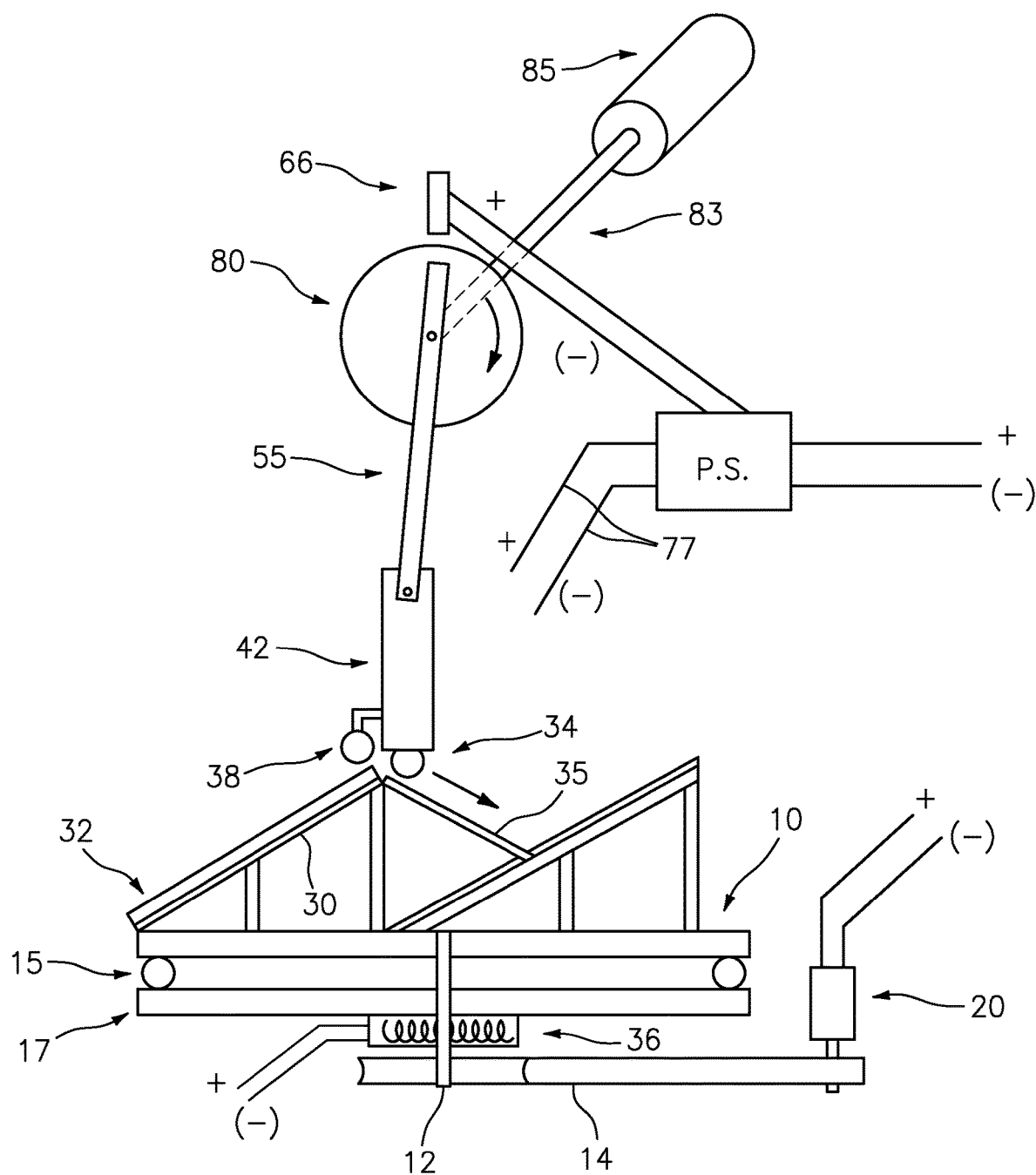
FIG. 4 is a schematic drawing of another exemplary embodiment using an electromagnetic clutch assembly, a reed switch, down ramp, and a guide wheel to operate the device in a free-wheeling mode on the down stroke.

FIG. 4 is a schematic drawing of an exemplary embodiment using an electromagnetic clutch assembly (36), a reed switch (66), down ramp (35), and a guide wheel (38) to operate the device in a free-wheeling mode on the down stroke. When the reed switch is triggered it cuts the electrical circuit between the power supply and the electromagnet (36) and the drive motor (20). This results in the rotating base to be free-wheeling.

As shown in FIG. 1 an external power source 20 rotates the main base platform 10 about an axis 12 via a belt or chain 14. The rotating base platform 10 sits on a bed of ball bearings 15 that are housed in a race 17. As the base platform 10 rotates risers 30 coupled to the base platform 10 and the riser permanent magnets 32 attached to the risers 30. The riser magnets 32 travel in close proximity to lifting rod magnets 34 attached to the bottom of the lifting rods 40. The magnets 32 and 34 are setup to oppose each other's magnetic flux fields. The riser magnets 32 on the top the risers 30 have the North poles facing up. The rod magnets 34 on the bottom of lifting rods 40 have their North poles facing down. As the two opposing forces move against each other the repelling force creates levitation forcing the lifting rods 40 to move upwards as the rotating base moves forward. The movement of the lifting rods 40 is tied together in unison with the lifting cap 50. As the lifting cap 50 moves upwards it pushes a connecting rod 55. As the lifting rods 40 reach the upper end of their stoke (cycle) the lifting rods 40 and lifting cap 50 come crashing back down via gravity to intercept the beginning of the up riser 30 to repeat the cycle over and over again.

The rotating base platform (10) can employ a variable speed via the external power source (20). Rotations of the base platform per minute can also be controlled by gearing, motor driver, and/or and rheostat switch to the electrical power source (20). The rotating base sits on ball bearings (15) that are located in a race (17).

Adjustable risers (30) are fixed to the rotating base platform (10). The risers (30) have an adjustable end that allows the angle between the base platform (10) and the risers (30) to be increased or decreased by raising the height or lowering the height respectively. The best performance of the device occurs when the range of the angle of the two meeting magnetic fields stay between 28 degrees and 33 degrees and thus optimizes magnetic field repulsion between the two magnetic fields of the riser magnets 32 and the lift rod magnets 34.

The control level of the magnetic fields can be adjusted by changing out permanent magnets (32) (34) with varying degrees of strength. Permanent magnets are assigned strengths depending on the lifting power normally measured in lbs. The permanent magnets (32) (34) are to be found along the tops of the risers (30) and the bottom of the lifting rods (40). The permanent magnets (32) (34) can be switched out to accommodate the lifting forces required by the end user. Using stronger magnets will provide more lifting force whereas using weaker magnets will provide a weaker lifting force.

Another aspect of the present invention is the lifting rod assemblies (42) shown in FIG. 1 and FIG. 2. The lifting rod assemblies (42) house the lifting rods (40) and supply rigid support to the moving lifting rods (40). Attached to the bottom of each lifting rod (40) is the lifting rod permanent magnet (34). The lifting rod permanent magnet (34) is coupled to the lifting rod 40 opposite the lifting cap 50. Each lifting rod has a lifting rod assembly and the number of lifting rods can vary depending on the configuration utilized. The configuration shown in the disclosure includes three lifting assemblies. The configuration can also operate using only one lifting rod assembly. Configurations can change to accommodate larger quantities of lifting rods and lifting rod assemblies.

Another aspect of the present invention is the position of the lifting rods in relation to the rest of the magnetic torque converter (5). The lifting rod assemblies (42) and the lifting rods (40) are in vertical alignment to the remainder of the device (5). The lifting rods are in communication with a lifting cap (50). The lifting cap (50) combines the total lifting effects of all the lifting rods into one force.

FIG. 3 shows four M.T.C.s (5) stacked in linear fashion to complete one power platform configuration connected by one crankshaft (6). These platforms allow various power performances depending on the requirements of the end user.

FIG. 4 shows an exemplary embodiment using an electromagnet (36), a reed switch (66), a crank wheel (80) and an external energy user (85). This allows the free-wheeling mode to accommodate moving the rotating base (10) using the force of gravity transferred to the down slope ramp (35) via the falling weight of the lifting arm (42) and the connecting rod (55). The rotating base (10) will move forward until it reaches a second reed switch (66) which will activate the energizing of the electromagnet (36) and the drive motor (20) to continue with the cycle. A drive axle (83) turns the turbine, generator, pump or other device (85). Leads (77) run from the power source (P.S.) to the electromagnet 36.

The lifting cap (50) is configured to transfer the total force to a connecting rod (55) via a mounted journal (53). This positions the connecting rod (55) to be part of an output driveline assembly (80) see FIG. 4. The crank wheel driveline assembly (80) can be part of a pumping station, generator, or other simple mechanical device that requires power to operate (85).

In the disclosed configuration a power source (P.S) operates the drive motor (20) and powers the reed switch (66) and the electromagnet (36). In an exemplary embodiment, a 12 volt battery is employed to provide power to the above mentioned components with a controller that takes the power from the turbine (85) converts AC to DC and sends power back to the battery (P.S.).

The movement of the end of the cycle is dictated by the orientation of the M.T.C. to the earth's horizon. If the orientation of the lifting rods is perpendicular to the horizon then the force of gravity will end the cycle as the magnets finish passing over one another. If the position of the M.T.C. has a different orientation to the horizon as previously mentioned then springs will be required to bring the cycle to an end as the magnets pass over each other.

This cycling causes an up and down movement of the lifting cap 50. This linear motion is turned into rotational movement using a crankshaft 6.

In order to reduce the load of the output lifting cap 50 and increase torque, levitation has to occur. The levitation occurs when two similar magnetic fields pass in close proximity at a rigid specified angle.

Another aspect of the present invention is to use/offer several types of stacking arrangements to vary power platforms.

There has been provided a magnetic torque converter. It is to be understood that the disclosure is not limited in its application to the details of the particular arrangements shown, since the invention is capable of other embodiments. Also the terminology used herein is for the purpose of description and not of limitation. While the magnetic torque converter has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A magnetic torque converter comprising:
   a platform configured to rotate about an axis;
   at least one riser coupled to said platform;
   at least one riser permanent magnet coupled to said at least one riser;
   a lifting cap supporting at least one lifting rod;
   a lifting rod permanent magnet coupled to said at least one lifting rod opposite said lifting cap, said lifting rod permanent magnet is configured to levitate along said at least one riser proximate said at least one riser permanent magnet through magnetic field repulsion, wherein said at least one riser permanent magnet comprises a magnetic pole opposite said lifting rod permanent magnet; and
   a connecting rod coupled to the lifting cap opposite the at least one lifting rod.

2. The magnetic torque converter according to claim 1, wherein said connecting rod is coupled to at least one of a driveline assembly, a crankshaft and a drive axle, wherein said at least one of the driveline assembly, the crankshaft and the drive axle are coupled to at least one of a flywheel and a mechanical device that requires power to operate.

3. The magnetic torque converter according to claim 1, wherein said at least one riser comprises a curved shape aligned with a curved shape of said platform and configured to guide said at least one lifting rod as said platform rotates.

4. The magnetic torque converter according to claim 1, further comprising:
   an external power source coupled to said platform through a drive belt or chain, said external power source configured to rotate the platform about the axis via the belt or the chain.

5. The magnetic torque converter according to claim 1, further comprising:
   a support frame attached to at least one lifting rod assembly, each of said at least one lifting rod assembly configured to support each of said at least one lifting rod.

6. The magnetic torque converter according to claim 1, wherein said at least one riser is adjustable with respect to said platform, wherein said at least one riser forms an inclined plane relative to said platform.

7. The magnetic torque converter according to claim 6, wherein said inclined plane comprises a range of an angle between magnetic fields of the at least one riser permanent magnet and said lifting rod permanent magnet of between 28 degrees and 33 degrees.

8. A magnetic torque converter comprising:
   a platform configured to rotate about an axis;
   at least one riser coupled to said platform, said at least one riser forming a wedge relative to said platform;
   at least one riser permanent magnet coupled to said at least one riser, said at least one riser permanent magnet forming a riser permanent magnet magnetic field;
   at least one lifting rod;
   a lifting rod permanent magnet coupled to said at least one lifting rod, said lifting rod permanent magnet forming a lifting rod permanent magnet magnetic field, said lifting rod permanent magnet is configured to levitate above said at least one riser proximate said at least one riser permanent magnet through magnetic field repulsion responsive to said at least one riser moving under said lifting rod, wherein said at least one riser permanent magnet comprises a magnetic pole opposite said lifting rod permanent magnet;
   a support frame attached to at least one lifting rod assembly, each of said at least one lifting rod assembly configured to support each of said at least one lifting rod;
   an external power source coupled to said platform, said external power source configured to rotate the platform about the axis; and
   a connecting rod coupled to a lifting cap opposite the at least one lifting rod.

9. The magnetic torque converter according to claim 8, wherein said at least one riser is adjustable with respect to said platform, wherein said at least one riser forms an inclined plane relative to said platform.

10. The magnetic torque converter according to claim 9, wherein said inclined plane comprises a range of the angle between magnetic fields of the at least one riser permanent magnet and said lifting rod permanent magnet of between 28 degrees and 33 degrees.

11. The magnetic torque converter according to claim 8, wherein the riser permanent magnet magnetic field and the lifting rod permanent magnet magnetic field can be varied by replacement.

12. The magnetic torque converter according to claim 8, further comprising a down slope ramp coupled to said platform proximate said riser, said down slope ramp configured to rotate said platform responsive to said at least one lifting rod dropping due to forces of gravity.

13. The magnetic torque converter according to claim 12, further comprising:
   an electromagnet coupled to said platform around said axis;
   a reed switch responsive to a crank wheel coupled to said connecting rod; and
   an external energy user coupled to said crank wheel.

14. A process for converting torque enhanced by magnetic levitation comprising:
   rotating a platform about an axis with a power source coupled to said platform, said platform including at least one riser coupled to said platform, said at least one riser forming a wedge relative to said platform; at least one riser permanent magnet coupled to said at least one riser, said at least one riser permanent magnet forming a riser permanent magnet magnetic field;
   lifting at least one lifting rod having a lifting rod permanent magnet coupled to said at least one lifting rod, said lifting rod permanent magnet having a lifting rod permanent magnet magnetic field;
   levitating said lifting rod permanent magnet above said at least one riser proximate said at least one riser permanent magnet through magnetic field repulsion responsive to said at least one riser moving under said lifting rod, wherein said at least one riser permanent magnet comprises a magnetic pole opposite said lifting rod permanent magnet;
   dropping said at least one lifting rod by the force of gravity responsive to said lifting rod permanent magnet moving past said at least one riser permanent magnet; and
   translating a connecting rod coupled to said lifting rod responsive to said lifting rod levitating and dropping.

15. The process of claim 14, further comprising:
rotating a driveline assembly coupled to said connecting rod.

16. The process of claim 14, further comprising:
rotating a drive axle coupled to a mechanical device responsive to said rotating said driveline assembly.

17. The process of claim 14, further comprising:
rotating said platform responsive to said at least one lifting rod dropping due to forces of gravity; wherein said platform comprises a down slope ramp coupled to said platform proximate said riser, said down slope ramp configured to rotate said platform responsive to said at least one lifting rod dropping.

18. The process of claim 14, further comprising:
guiding said at least one lifting rod with said at least one riser as said platform rotates; said at least one riser comprises a curved shape aligned with a curved shape of said platform.

19. The process of claim 14, further comprising:
adjusting said at least one riser with respect to said platform, wherein said at least one riser forms an inclined plane relative to said platform.

20. The process of claim 19, wherein said inclined plane comprises a range of an angle between magnetic fields of the at least one riser permanent magnet and said lifting rod permanent magnet of between 28 degrees and 33 degrees.

* * * * *